… (abbreviated)

2,969,395
VINYLATION PROCESS

John J. Nedwick, Philadelphia, and John Robert Snyder, Malvern, Pa., assignors to Rohm & Haas Company, Philadelphia, Pa., a corporation of Delaware No Drawing. Filed Jan. 27, 1959, Ser. No. 789,257

7 Claims. (Cl. 260—584)

This application is a continuation-in-part of United States Serial No. 538,767, filed October 5, 1955, and now abandoned.

This invention deals with a process for preparing vinyl ethers. It deals with a process wherein an alcohol to be vinylated, a catalyst, and an acetylene solvent, as defined below, are mixed, the resulting liquid mixture is held below about 10° C. while acetylene is passed thereinto under pressure, and the liquid mixture charged with acetylene is passed under pressure to a heating zone where it is heated at a reacting temperature between about 160° and 250° C., preferably 180° and 210° C., under pressure sufficient to prevent desorption of acetylene and to maintain the mixture in liquid phase. The reaction mixture is then resolved with separation of the vinyl ether formed.

Our process is particularly desirable and effective for vinylating high molecular weight alcohols, and also alcohols having functional substituents as in polyhydric alcohols and aminoalcohols.

Processes have been proposed wherein an alcohol such as butanol is reacted with gaseous acetylene in the presence of an alkali metal hydroxide or alcoholate. The process as originally proposed suffers from various difficulties, including slowness of reaction. To increase the rate of preparation of vinyl ethers from alcohols acetylene was supplied under pressure. This introduced additional hazards in using acetylene under pressure at reaction temperatures of 100° to 250° C., and the acetylene gas supplied to reacting mixtures at such temperatures was, therefore, diluted with a non-reacting gas such as nitrogen or methane to decrease the hazards involved. This necessitated handling and recirculating considerable volumes of gases and liquids. There was required apparatus of considerable size for a given output in a fixed time. The slowness of reaction favors side reactions and causes fouling and loss of catalyst. Slowness of reaction, increased size of apparatus, and consumption of materials in side reactions all increase the cost of operation.

Several modifications in the basic process have been suggested. For example, alkali metal zincates and cadmates have been proposed as catalysts, particularly in conjunction with an inert solvent such as Decalin or naphtha, to improve the rate of reaction and to give a better ratio of vinyl ethers to acetals formed as secondary products. This modification still needs considerable time for good conversion and requires the handling and recirculation of large volumes of gases and liquids and large capacity of apparatus and equipment to provide a good volume of output. Side reactions such as consumption of catalyst still persist.

It has also been proposed to saturate a chilled mixture of catalyst and the alcohol to be vinylated with acetylene and then to react the mixture in liquid phase at a temperature of not over 150° C. This proposed process avoided handling acetylene under pressure at high temperatures and, therefore, it reduced the hazards of using acetylene at high pressures. But it could not be a very efficient process, since conversion per pass was always limited at best to the proportion of acetylene dissolved in the alcohol to be reacted. In most cases the solubility of acetylene in alcohols is not high. The alcohols which may be handled in this way are limited in type and number, alcohols becoming viscous or solid at reduced temperatures not being utilizable.

In our process conversion can be carried, if so desired or required, practically to completion in a relatively short interval of time, although there are situations where the most convenient mode of operation does not require complete conversion of alcohol in one pass, but rather a good degree of conversion. Speed of conversion is also favorable in our process. This is highly important because the time factor determines the output of any given piece of apparatus, thus controlling costs. It also has a great influence on catalyst life and secondary reactions.

Another advantage of our process lies in the fact that the greatest variety of alcohols can be utilized and converted to vinyl ethers. The only significant limitation is that alcohols having groups supplying an acidic hydrogen, such as sulfonic, phosphoric, or carboxylic, which supply such hydrogen directly or groups which do so by splitting, such as β-halo or β-cyano, are not desirable since they destroy the catalyst. There are some alcohols which have an alkali-sensitive group and which may be altered at this group with the alcoholic hydroxyl group being nevertheless vinylated. The alcohols may be monohydric or polyhydric. They may be saturated or unsaturated and have a hydrocarbon residue or a residue composed of atoms in addition to carbon and hydrogen, provided in each case, of course, that the alcohol is not decomposed by the strong alkali used as catalyst.

The alcohols may be represented by the simple formula ROH, where R is a substituted or unsubstituted hydrocarbon group forming an alcohol, which, if substituted, is free of acidic substituents, including such groups as alkyl, cycloalkyl, alkenyl, cycloalkenyl aralkyl, and aralkenyl. There may be used alcohols having such groups with amino substituents. A subclass of particular value comprises the compounds having one or more ether substituents, such as alkoxyalkyl, alkylthioalkyl, alkenoxyalkyl, aralkoxyalkyl, aryloxyalkyl, arylthioalkyl, cycloalkoxyalkyl, alkoxyalkoxyalkyl, alkoxyalkoxyalkoxyalkyl, and the like, with more ether groups, aryloxypolyalkoxyalkyl, aralkoxypolyalkoxyalkyl, cycloalkoxypolyalkoxyalkyl and so on. There may also be used polyhydroxy compounds, in which case the above R group becomes hydroxyalkyl, hydroxyalkenyl, hydroxycycloalkyl, hydroxyalkylaralkyl, polyhydroxyalkyl, hydroxyalkoxyalkyl, hydroxypolyalkoxyalkyl, hydroxyalkylthioalkyl, hydroxyalkyaminoalkyl, etc.

When R is an alkyl group, the alcohols include methanol, ethanol, isopropyl alcohol, propanol, butanol, 2-ethylbutyl alcohol, hexyl alcohol, octyl alcohol, 2-ethylhexyl alcohol, capryl alcohol, nonyl alcohol, 2,2,4-trimethylhexyl alcohol, decyl alcohol, dodecyl alcohol, cetyl alcohol, stearyl alcohol, and homologues and isomers of these alcohols. Usually the alkyl group will not contain over 18 carbon atoms but is not limited thereto. Alcohols up to 12 carbon atoms are preferred. Although tertiary alcohols have been successfully vinylated, but not in best yields, non-tertiary alcohols; i.e., primary and secondary, are those of first choice.

Comparable alkenols are useful as starting materials, including allyl alcohol, methallyl alcohol, crotyl alcohol, pentenyl alcohols, 2-ethylhexenyl alcohol, undecenyl alcohol, dodecenyl alcohol, and oleyl alcohol. There may also be used arylalkenols, such as cinnamyl alcohol.

Aralkanols form another interesting subgroup and include such compounds as benzyl alcohol, phenylethyl alcohol, 3-phenylpropyl alcohol, methylbenzyl alcohol, chlorobenzyl alcohol, butylbenzyl alcohol, phenybutyl alcohol, naphthalenemethanol, or naphthaleneethanol.

Cycloaliphatic alcohols may be saturated or unsaturated and are illustrated by cyclopentanol, cyclohexanol, terpineols, quintol, dicyclopentanol, dicyclopentenol, and other polycyclopentanols and polycyclopentenols.

Other cycle-containing alcohols are those which have a heterocycle in their non-hydroxyl residue as in 2,5-dimethyl-2-hydroxymethyl-2,3 - dihydropyran, 2 - hydroxymethyltetrahydropyran, tetrahydrofurfuryl alcohol, 4-(hydroxypropyl)pyridine, 2-methyl-3-β-hydroxyethyl-1,3-oxazolidine or 2,2-dimethyl-4-hydroxymethyldioxolane.

Alcohols having one or more ether substituents are highly amenable to reaction with acetylene by the process of this invention. Typical ether alcohols include methoxyethanol, ethoxyethanol, butoxyethanol, octoxyethanol, dodecyloxyethanol, hexadecyloxyethanol, phenoxyethanol, butylphenoxyethanol, octylphenoxyethanol, benzoxyethanol, butylbenzoxyethanol, cyclohexoxyethanol, vinyloxyethanol, allyloxyethanol, 2-ethyl-1-hexenoxyethanol, oleyloxyethanol, tetrahydrofurfuryloxyethanol, methoxyethoxyethanol, octoxyethoxyethanol, phenoxyethoxyethanol, benzoxyethoxyethanol, cyclohexoxyethoxyethanol, vinyloxyethoxyethanol, undecenyloxyethoxyethanol, butoxyethoxyethoxyethonal, and other polyethoxyethanols of comparable structure, the comparable propanols and butanols, of which butoxypropanol, ethoxybutanol, phenoxypropanol, benzoxypropanol, cyclohexoxypropanol, or allyloxypropoxypropanol will serve as specific examples; mixed propoxyethoxy compounds of which butoxypropoxyethanol, butylphenoxypropoxyethanol, cyclohexoxypoxyethanol, or ethoxypropoxyethoxy ethanol will serve as examples; substituted ether alcohols, such as N,N-dimethylaminoethoxyethanol, N - benzyl-N-methylaminoethoxyethanol, N - cyclohexyl-N-methylaminoethoxyethanol, morpholinoethoxyethanol, pyrrolidinopropoxyethanol, or piperidinoethoxypropanol, also alkylthioalkanols such as ethylthioethanol, tert-butylthioethanol tetradecylthioethanol, phenylthioethanol, or benzylthioethanol.

Compounds containing both an amine group and an alcoholic hydroxyl group form a subgroup of particular value and interest. The amine group may be primary, secondary, or tertiary. The simplest of these compounds is aminoethanol, but there can likewise be used N-methylaminoethanol, N,N-dimethylaminoethanol, 2-aminopropanol, N-methylaminopropanol, N,N-dimethylaminopropanol, 2-amino-2-methyl-1-propanol, 2-dimethylamino-2-methyl-1-propanol, 1,3-diamino-2-propanol, 1,3-bis(dimethylamino)-2-propanol, 1,3-bis(dinonylamino)-2-propanol, 1,3-bis(N-methylamino)-2-propanol, 1,3-bis(N-nonylamino)-2-propanol, 1,3-bis(N-cyclohexylamino)-2-propanol, 1,3-bis(N-benzylamino)-2-propanol, 4-aminobutanol, 5-aminopentanol, N-ethylaminoethanol, N,N-dibutylaminoethanol, N-octylaminoethanol, N-tert-dodecylaminoethanol, N - cyclohexylaminoethanol, N - phenylaminoethanol, N-benzylaminoethanol, and other aminoalkanols without or with N-substituents, including 2-morpholinopropanol, 3-morpholinopropanol, pyrrolidinoethanol, piperidinoethanol, methylmorpholinoethanol, and other alkyl ring substituted cyclic aminoalkanols as well as amino-containing ether alcohols, such as aminoethoxyethanol, N,N-diethylaminoethoxypropanol, or morpholinoethoxyethanol, or piperidinoethoxyethanol.

Amino substituted aralkanols, such as 2- or 4-aminobenzyl, dimethylaminobenzyl, α-dimethylaminopropylbenzyl, or 2,5-diaminobenzyl alcohols may be used and also aminocycloalkanols, such as 2- or 4-aminocyclohexanol, and 2-diethylaminocyclohexanol.

The polyhydric alcohols form and interesting subclass, because they can form monovinyl and/or polyvinyl ethers. The polyhydroxy compounds include the simple alkylene glycols, such as ethylene glycol, propylene glycol, trimethylene glycol, butylene glycols, pentamethylene glycol, hexamethylene glycol, decamethylene glycol, α,α'- xylylenediol, cyclohexanediol, 2-cyclohexene-1,4-diol, the butenediols, 3-pentene-1,2-diol, and other alkenediols, or oxa, thia, or aza derivatives thereof. These include such compounds as thiodiethylene glycol, thiodipropylene glycol, 3-azapentane-1,5-diol, 3-methyl-3-azapentane-1,5-diol, 3,6-dimethyl-3,6-diazaoctane-1,8-diol, or other N-alkyl substituted azaalkylene glycols, or the glycols having chains interrupted by oxygen, as in diethylene glycol, dipropylene glycol, dibutylene glycol, triethylene glycol, tetraethylene glycol, hydroxyethoxypropoxyethanol, bis(hydroxyethoxy)hexane, etc. Polyhydric alcohols of particular interest may be summarized by the formula

$$HOC_nH_{2n}(XC_nH_{2n})_mOH$$

where X is a hetero atom or group, —O—, —S—, or —NR⁰— where R⁰ is H or CH₃, $n$ is a small integer of at least two, and $m$ has a value from zero to about three.

The polyhydric alcohols may also take the form of alkenylene and alkynylene glycols, such as 2-buten-1,4-diol, 3-hexene-2,5-diol, 2,5-dimethyl-3-hexin-2,5-diol, 2,5-diphenyl-3-hexin-2,5-diol, 3,6-dimethyl-4-octin-3,6-diol, or comparable glycols, having the hydrocarbon chains interrupted by a heteroatom.

Other polyhydric alcohols of interest comprise those having more than two hydroxyl groups, as in glycerol, butanetriol, trimethylolethane, or other polyhydric alcohols which can be dissolved in an acetylene solvent. Mono- and polyethers of such alcohols still having at least one hydroxyl group may also be used, as α-methyl glyceryl ether, α-phenyl glyceryl ether, α-allyl glyceryl ether, etc.

The catalyst used in the reaction system of this invention are alkaline agents which are capable of forming alcoholates or the alkali metal alcoholates themselves. These agents are strongly basic alkali metal catalysts. There may be used alkali metals, particularly lithium, sodium, and potassium, or alkali metal oxides, or sodium or potassium hydroxide or cyanide, or preformed alkali metal alcoholates, such as sodium methoxide, sodium ethoxide, or potassium butoxide, or other alkali metal alcoholate, particularly of the alcohol used to form the vinyl ether. Other strongly alkaline compounds which act as catalysts are potassium and sodium sulfides. These promote relatively rapid reaction, but give some by-products containing sulfur. The catalyst concentration may vary from one to twenty equivalent percent, based on the alcohol, and is usually two to ten percent of the alcohol calculated on the basis of equivalents. These are, of course, mole percents when the alcohols are monohydric.

A critical feature of our process depends upon the use of an inert organic liquid which is a good solvent for acetylene. The solvent or solvents used must have an alpha value, a solubility value expressed in terms of volume of acetylene measured under standard conditions which is dissolved in one volume of solvent at one atmosphere pressure, of at least 18 and preferably of about 20 or more at 0° C. The alpha value should be at least about 14 at 10° C. The solvent must also be inert with respect to catalyst and alcohol, and preferably to acetylene except for dissolving it, miscible at least in part with the alcohol being reacted, capable of giving a fluid mixture with alcohol and catalyst at the saturation temperature (e.g., at about 0° C.), and capable of being separated from the other components of the mixture after reaction.

Solvents which meet the above requirements are found in several classes of organic liquids. The broadest class of liquid solvents is based on ethers, particularly upon polyethers, which provide considerable choice with varying solubilities, miscibilities, freezing points, distillation ranges, and so on. Useful polyethers include dimethyl formal, diethyl formal, dimethylacetal, diethylacetal, dioxane, dioxolane, 2-methyldioxolane, and the monomethyl, dimethyl, monoethyl, and diethyl ethers of ethylene glycol, diethylene glycol, triethylene glycol, or tetraethylene glycol. Other ethers include tetrahydrofuran and ethers having oxygen replaced by sulfur, as in $$CH_3OCH_2CH_2SCH_2CH_2OCH_3$$

or the comparable diethyl ether which may also be considered to be polyethers. Some miscellaneous compounds which may be used are N-methylpyrrolidone and N-ethylpyrrolidone. Some solubility coefficients of useful solvents are noted in Table I. Mixture of two or more acetylene solvents may be used as well as individual solvents.

TABLE I

*Acetylene solubility values* ($\alpha$)

| Compound | $\alpha$, 0° C. | $\alpha$, 10° C. |
| --- | --- | --- |
| Tetrahydrofuran | 37.4 | 27.8 |
| Methylal | 36.0 | 24.3 |
| Diethyl Ether of Diethylene Glycol | 30.0 | 21.1 |
| Dimethoxyethane | 27.6 | 22.8 |
| 2-Methyl-1,3-dioxolane | 26.2 | 20.1 |
| Diethyl diethoxyethane | 25.2 | 18.6 |
| Methyl Methoxyethanol | 22.7 | 16.5 |
| Diethyl Ether | 19.8 | 14.8 |
| Ethoxyethanol | 18.9 | 14.1 |
| Acetal | 18.2 | 13.6 |
| Dimethyl Ether of Triethylene Glycol | 20.4 | 15.5 |
| N-Methyl Pyrrolidone | 53.6 | 41.8 |

For some combinations of alcohol to be vinylated and solvent for acetylene it is helpful to use an auxiliary solvent to insure miscibility of alcohol and solvent and assist in solution of the catalyst in the mixture. A useful class of auxiliary solvents comprises alcohols which are no more reactive than the alcohol which is to be converted to vinyl ether. At most, vinyl ethers from the several alcohols may then be formed. These can be separated. Examples of the use of an auxiliary solvent are mixtures of ethylene glycol as reactant, dimethoxyethane as solvent, and ethanol as auxiliary solvents or mixtures of ethylene glycol, dimethoxyethane, and vinyloxyethanol.

The successful operation of our process requires that there be used a proper ratio of the defined acetylene solvent to the alcohol to be vinylated. This ratio is broadly from about 1:10 to 1:1 by weight or preferably from 1:7 to 1:1.5 by weight. The particular ratio selected within these limits will depend upon the conversion desired. The proper ratios for the desired conversion are defined for each solvent, alcohol, and catalyst combination by the $\alpha$-value for each combination which determines the molar ratio of acetylene which can be dissolved in the mixture under the conditions specified for the alcohol to be vinylated.

To perform the process of this invention, catalyst is taken up in the alcohol to be reacted or in this alcohol and the auxiliary solvent and the proper ratio of solvent is mixed therewith. The resulting mixture is cooled and held below about 10° C. Temperatures from 10° C. to −30° C. or lower may be used, the lowest practical temperature depending upon the point at which the mixture remains relatively fluid.

Acetylene is then introduced into this cold mixture and supplied thereto under pressure above 10 atmospheres up to about 30 atmospheres. The amount of acetylene supplied will depend upon the conversion which is desired. In handling acetylene the known precautions are taken, such as use of small tubes and flash arrestors. In the absorption vessel it is desirable to have as small a free volume of gas as is practicable. If so desired, the acetylene supplied for absorption may contain an inert gas, which serves as a diluent. Since inert gases, such as nitrogen or methane, have low solubility in the reaction mixture, they are left unabsorbed. They can be taken off and readily recycled. The amount of acetylene absorbed depends on the alcohol, the solvent, the ratio of these two components, the temperature and the pressure, and secondarily on the catalyst used.

The mixture with its absorbed charge of acetylene is now heated in liquid phase in a reaction zone, where the mixture is subjected to sufficient pressure to maintain it entirely in the liquid state. Temperatures from 160° to 250° C. are used, the range of 180° to 210° C. being usually preferred. Pressures are from about 900 p.s.i. upward, the range of 1000 to 5000 p.s.i. being commonly used at preferred temperatures. The reaction zone may conveniently take the form of a coil which is heated to a reacting temperature and through which the liquid mixture is passed. Under these conditions no difficulties have been encountered, since acetylene is not present as a gas, reaction of acetylene and alcohol is rapid, and almost all of the acetylene in the reaction mixture is consumed. It should be noted that no acetylene is pressed into the reaction mixture while it is being heated and that no gas phase is present during reaction.

The residence time of the reaction mixture in the reaction zone may vary from less than one minute upward. Times of one to ten minutes are common, some conversions being completed in even less than one minute and a few requiring more than ten. A short residence time is desirable to obviate or minimize side reactions and destruction of catalyst. This time is preferably that required for practically complete conversion of acetylene in the reaction mixture.

After reaction has taken place between the alcohol to be vinylated and the absorbed acetylene in the reaction mixture, the pressure on the charge is released and the mixture is resolved, usually through distillation.

Details of procedure are further presented in the following illustrative examples wherein parts are by weight.

EXAMPLE 1

In a reaction vessel there was placed 610 parts of $\beta$-aminoethanol. The vessel was swept out with nitrogen and sodium metal was added in an amount of 12.5 parts. The sodium reacted with the alcohol. Thereupon addition was made of 90 parts of dimethoxyethane. The mixture was then cooled to below 4° C. and acetylene was charged thereto. The acetylene was taken up by the mixture under pressures up to 320 p.s.i.g. At this point the mixture contained 156 parts of acetylene.

The mixture was then passed in liquid phase through a heated reaction zone where it reached a temperature of 180°–185° C. The residence time of the mixture in the heated zone was between four and five minutes. Sufficient pressure was used to maintain the mixture as a liquid. The pressure used was between 1500 and 1600 p.s.i.g. The reaction mixture was released to a low pressure zone where the volatile materials were distilled off under reduced pressure. The distillate was fractionated under reduced pressure. Solvent together with vinyl ether came over at 50°–70° C./250 mm. A fraction of vinyl $\beta$-aminoethyl ether was obtained at 66°–67° C./120 mm.

Conversion based on the $\beta$-aminoalcohol taken was over 55% and yield of product on alcohol used was about 85%. Conversion and yield on the basis of acetylene were about 90%.

Repetition of the above procedure with substitution of 90 to 100 parts of methylal for the dimethoxyethane leads to the identical product in about the same yield. In place of the above sodium there may be used 19 parts of potassium or 20 parts of sodium hydroxide or 28 parts of potassium hydroxide with production of $\beta$-aminoethyl vinyl ether in about the same yield.

EXAMPLE 1–A

It will be obvious that the procedure in Example 1 (and in Examples 2–15 which follow) can be modified, without departing from the scope of this invention, by varying the way in which the reactants are brought together in the liquid phase in the high temperature reaction zone. For instance, instead of dissolving the acetylene in the mixture of the acetylene solvent, alcohol and catalyst, the acetylene may be dissolved in the acetylene solvent alone or in the acetylene solvent plus a part of the alcohol. The catalyst and the remaining part or all of the alcohol are then mixed with this acetylene-laden stream in the high-pressure reactor system ahead of, at the start of, or at various points along the heated reaction zone.

To illustrate, the procedure of Example 1 is varied as follows: In a pressure vessel there are placed 300 parts of β-aminoethanol and 90 parts of dimethoxyethane. The vessel is swept out with nitrogen. The mixture is then cooled to below 4° C. and acetylene is charged thereto. The acetylene is taken up by the mixture under pressures up to 320 p.s.i.g. At this point, the mixture will contain on the order of 140 parts of acetylene.

The mixture is then passed in liquid phase under pressure into a heated reaction zone having a temperature of about 180°–185° C. At the start of the heated section there is injected into the acetylene-bearing stream a solution of six parts of sodium metal reacted with 150 parts of β-aminoethanol. Half way through the reaction zone there is injected an additional six parts of sodium metal in 150 parts of β-amino-ethanol. The rates of injection of the various streams are adjusted to a ratio of 5:1:1 parts, and the mixture is maintained in the heated zone for a residence time of between four and five minutes. Sufficient pressure is used to maintain the mixture as a liquid, averaging between 1500 and 1600 p.s.i.g. The reaction mixture is released to a low pressure zone where the volatile materials are distilled off under reduced pressure. The distillate is fractionated under reduced pressure. Solvent, together with a little vinyl ether, comes over at 50°–70° C./250 mm. A fraction of vinyl β-aminoethyl ether is obtained at 66°–67° C./120 mm.

EXAMPLE 1-B

Another variation of the Example 1 process involves the use of an apparatus comprising an absorber, pumps, heated coil, and relief valves leading to a chamber for separating gas and liquid. The absorber is capable of being cooled to a desired temperature and is capable of withstanding pressures used for pressing acetylene into solvent passing therethrough. A pump passes the resulting solution of acetylene in the acetylene solvent from the absorber into the heated coil. Along the coil are several inlets for admitting ethylene glycol and the catalyst.

The absorber is supplied with dimethoxyethane and cooled to about 7° C. Acetylene is pressed thereinto at about 250 p.s.i.g. The solution of acetylene is pumped at about 2000 p.s.i.g. through the coil which is held at about 200° C. A solution of 6 percent of potassium hydroxide in ethylene glycol is pumped into the inlets along the coil. The residence time of the mixture in the coil should be between 4–5 minutes. The rate of supplying dimethoxyethane is maintained at approximately 12.5 cc. per minute, and the rate of addition of the solution of potassium hydroxide in ethylene glycol is also set at about 12.5 cc. per minute.

The reaction mixture is let down to atmospheric pressure, unreacted acetylene is separated, and the reaction mixture is flash-distilled. The flash distillate is fractionally distilled. The dimethoxyethane is distilled off and the fractionation continued under reduced pressure. A small forerun containing water and some 2-methyl-1,3-dioxolane comes over at 27°–31° C./140 mm. At 46°–48° C./30 mm., there is obtained an azeotrope of the divinyl and monovinyl ethers of ethylene glycol. At 60° C./30 mm., a fraction consisting of the pure monovinyl ether of ethylene glycol is obtained.

If the divinyl ether is desired as the principal product, the distillation is discontinued at the point where pure monovinyl ether starts to distill and to the still residue is added ethylene glycol equivalent to the amount of 1,2-divinyloxyethane formed and taken off. The resulting mixture is again injected into the acetylene-laden solvent stream in the high pressure reactor. The mixture is then heated under pressure and the reaction mixture is distilled, as above.

These operations are repeated with recycling. An equilibrium condition is reached with the ratio of β-vinyloxyethanol to ethylene glycol in the recycle charge of about 2:1. Conversion of added ethylene glycol, under these conditions, to the divinyl ether is about 40 percent per pass. The yield of ethers is very high. The ratio of monovinyl to divinyl ethers can be widely varied by adjusting the conditions of recycle, addition, and take-off.

EXAMPLE 2

Under a nitrogen blanket there was dissolved 9.3 parts of sodium in 600 parts of N-methylethanolamine. Addition was then made of 90 parts of dimethoxyethane and the mixture was cooled to about 0° C. and saturated with acetylene under pressure until about 104 parts had been absorbed by the mixture, a pressure of 250 p.s.i.g. being reached at this point.

The mixture was then passed through a heated reaction zone under sufficient pressure to maintain the liquid phase (1400–1500 p.s.i.g.). The temperature in this zone reached 185° C. Residence time was four minutes.

The reaction mixture was taken from the reaction zone and distilled. The fraction taken at 67°–68° C./120 mm. was identified as vinyl N-methylaminoethyl ether. The conversion based on alcohol taken was 40% and the yield based on alcohol consumed was about 70%.

The above procedure was followed but with substitution of 32 parts of sodium hydroxide for the above sodium hydroxide for the above sodium and substitution of 160 parts of methylal for the above dimethoxyethane. Conversion to vinyl N-methylaminoethyl ether was about 35%. Repetition of this preparation with temperature of reaction kept below 170° C. resulted in a conversion to the desired ether of about 30%. Yields on alcohol consumed were about 70% in both cases.

Substitution of dimethyl acetal for the above dimethoxyethane leads to the formation of the identical product in the same way and in a similar conversion and yield. Conversions are also about the same when the dimethyl or diethyl ethers of diethylene or triethylene glycol are used.

EXAMPLE 3

Under a nitrogen blanket 20.7 parts of sodium was dissolved in 536 parts of N,N-dimethyl-β-hydroxyethylamine. Addition was made of 76 parts of methylal. The mixture was chilled below 5° C. and treated with acetylene, the pressure being carried to 220 p.s.i.g. with absorption of 80 parts.

The mixture was then pumped under pressure sufficient to maintain entirely the liquid phase through a heated coil. A maximum temperature of about 180° C. was noted. Residence time in the reactor was eight minutes.

The reaction mixture was resolved through flash distillation under reduced pressure and then through fractionation of the first distillate. An azeotrope of 70% vinyl dimethylaminoethyl ether and 30% of the starting alcohol, as shown by analyses, came over at 83°–85° C./250 mm.

Repetition of the above procedure with substitution of 90 parts of dimethoxyethane for the methylal gave an almost identical result. In another variation of the above procedure a reaction mixture of the same composition was heated to 196° C. with a residence time of five minutes. Conversion was about 35% based on the alcohol.

The azeotropes formed above were treated with sodium metal and then distilled. The vinyl dimethylaminoethyl ether thus prepared distilled at 70° C./120 mm. The refractive index $n_D^{25}$, is 1.4213.

EXAMPLE 4

Solution was made of 23 parts of sodium in 460 parts of anhydrous ethanol denatured with a little benzene, the mixture being cooled externally with ice water. Addition was made of 90 parts of dimethoxyethane. Acetylene was passed into the resulting solution while it was cooled to 0°–5° C. until absorption of 160 parts of acetylene was obtained, the pressure being 330 p.s.i.g.

The mixture was then passed into a heated reaction zone, where a temperature of 195°–200° C. was reached with pressures at 1600–1700 p.s.i.g. Residence time was about six minutes. The reaction mixture was resolved by distillation. Vinyl ethyl ether was distilled at 35.5° C. in a conversion of 40% and a yield of 80% based on alcohol. Conversion on acetylene charged was 70% and yield on acetylene consumed was about 100%.

Repetition of the above procedure with substitution of 60 parts of potassium hydroxide for the above sodium led to the identical product in similar yields.

EXAMPLE 5

By the procedure used above 20 parts of sodium was dissolved in 746 parts of n-butyl alcohol. Addition was made of 126 parts of methylal. The solution was then cooled to 0°–5° C. and saturated with acetylene under pressure up to 220 p.s.i.g. The mixture was passed under pressure sufficient to maintain the liquid phase through a heated reaction zone where temperatures of 200°–210° C. were reached. Residence time was about five minutes. The reaction mixture was resolved through distillation and fractionation. At 42°–44° C. the methylal was taken off and at 90°–95° C. an azeotropic fraction containing 90% of vinyl butyl ether was obtained. Conversion to vinyl ether based on alcohol was about 40% and the yield 90%.

Resolution of the azeotrope with the use of sodium gave pure vinyl butyl ether.

EXAMPLE 6

(a) Under a nitrogen blanket 9.0 parts of sodium was added to 520 parts of n-octyl alcohol. When the reaction with the sodium was complete, 152 parts of methylal was added. The mixture was then charged with acetylene at about 0° C. up to 120 p.s.i.g. to introduce 40 parts of acetylene. The liquid mixture was then forced through a reactor under pressure sufficient to maintain the liquid phase and, as usual, prevent desorption of acetylene, where the mixture was heated to reacting temperatures and reached 205° C. The residence time was 5.4 minutes. The reaction mixture was distilled. After a fraction of methylal had been taken at 42°–43° C., n-octyl vinyl ether was obtained at 44°–49° C./2–3 mm. The conversion on alcohol was 28% and on acetylene 90%. The yield on alcohol was about 80% and on acetylene consumed about 100%.

In place of the above alkanols there can be used equivalent weights of other saturated monohydric alcohols, including dodecyl alcohol which produces vinyl dodecyl ether in good yields. With alcohols higher than the $C_{12}$ alcohol it is helpful to use a lower alkanol as an auxiliary solvent. Thus, a reaction mixture based on a commercial cut of higher alcohols (81% dodecyl, 12% cetyl, and 7% stearyl) with 15% of ethanol in the reaction mixture gives a fair yield of vinyl alkyl ethers where the alkyl group varies from 12 to 18 carbon atoms. Some ethyl vinyl ether is formed and is separated in the light fractions. A typical preparation with such alcohols follows.

(b) To 105 parts of ethyl alcohol is added under a nitrogen blanket 8 parts of potassium. When all of the potassium has reacted, 300 parts of a commercial higher alcohol, which is a mixture containing 90% $C_{12}$ and $C_{14}$ alcohols and 5% each of $C_{10}$ and $C_{16}$ alcohols, 90 parts of octadecyl alcohol and 126 parts of dimethoxyethane is added. This solution is charged to a mixing vessel and acetylene passed into it until 52 parts are absorbed. The pressure is 340 p.s.i.g. and the temperature is 14° C. This mixture is now passed through a heated reaction zone maintained at 200° C. Contact time is 4.7 minutes. The pressure is 1500–1600 p.s.i.g. The reaction mixture is degassed and then vacuum flash-distilled. The flash-distillate is subjected to fractional distillation. Some ethyl vinyl ether is obtained. Mixtures containing 60 to 80% of the vinyl ether and respective alcohol of dodecyl, tetradecyl and octadecyl alcohols are obtained. The pure vinyl ethers can be isolated by the usual methods.

EXAMPLE 7

To 547 parts of ethylene glycol there was added 20.3 parts of sodium under a nitrogen blanket. The mixture was held at 60°–70° C. to accelerate solution of the sodium. Thereupon additions were made of 108 parts of dimethoxyethane and 117 parts of ethanol. The resulting mixture was passed through a mixing bomb where it was charged with acetylene up to a pressure of 360 p.s.i.g. at a temperature of 4° C. until 104 parts thereof had been absorbed. The presence of the ethanol in the mixture kept it homogeneous in the mixing bomb, it being the practice to choose solvents and proportions to ensure homogeneity throughout this procedure.

The mixture charged with acetylene was passed to the reactor under pressure and there held under a pressure which ensured a completely liquid phase (about 1700 p.s.i.g.). The temperature reached in the reactor was 196° C. with a residence time of 3.4 minutes. The reaction mixture was flash-distilled and the flash-distillate was fractionated in a column. Some ethyl vinyl ether was obtained at 35.5° C. and a mixture of dimethoxyethane and ethanol was distilled at 75°–78° C. A small fraction taken at 52°–55° C./55 mm. was identified as the azeotrope of 90% of divinyl ether of ethylene glycol and 10% of the monovinyl ether. At 72°–75° C./55 mm. vinyloxyethanol was obtained. The conversion to vinyloxyethanol is 38% and the yield over 75%, based on the glycol. A low conversion is here desirable to give the monovinyl ether. The azeotrope is readily resolved with washing out of the β-hydroxyethyl vinyl ether.

EXAMPLE 8

(a) The procedure of Example 7 is followed with separation of ethyl vinyl ether, ethyl alcohol, dimethoxyethane, and 1,2-divinyloxyethane by fractional distillation to leave still bottoms. To the bottoms are added 110 parts of the dimethyl ether of triethylene glycol and an amount of ethylene glycol equivalent to the 1,2-divinyloxyethane taken off. This reaction mixture is chilled and while at 5°–8° C. is treated with acetylene under pressure as in Example 7. The liquid mixture charged with acetylene is heated under pressure to about 195° C. The pressure is relieved and the reaction mixture is fractionally distilled at reduced pressures. A small forerun containing water and some 2-methyl-1,3-dioxolane comes over at 27°–31° C./140 mm. At 46°–48° C./30 mm. there is obtained an azeotrope of the divinyl and monovinyl ethers of ethylene glycol.

The distillation is discontinued and to the still residue is added ethylene glycol equivalent to amount of 1,2-divinyloxyethane formed and taken off. The resulting mixture is again chilled and treated with acetylene under pressure. The mixture is then heated under pressure and the reaction mixture is distilled, as above.

These operations are repeated with recycling. An equilibrium condition is reached within the ratio of β-vinyloxyethanol to ethylene glycol in the recycle charge is about 2:1. Conversion of added ethylene glycol under these conditions to the divinyl ether is about 40% per pass. The yield of ethers is very high. The ratio of monovinyl to divinyl ethers can be widely varied by adjusting the conditions of recycle, addition, and take-off.

(b) To 352 parts of β-hydroxyethyl vinyl ether is added under a nitrogen blanket 14 parts of sodium. When the sodium has all reacted, 124 parts of ethylene glycol and 122 parts of triethylene glycol dimethyl ether are added. The mixture is now passed to a saturating vessel where acetylene is fed into the mixture until about 65 parts are absorbed with the pressure at 300 p.s.i.g. and the temperature at 7° C. The mixture is now passed through a heated reaction zone for five minutes at a temperature of 185° C. and a pressure of 1500–1700 p.s.i.g. The reaction mixture is now subjected to fractional distillation. A small amount of forerun containing water and 2-methyl-1,3-dioxolane comes over at 27°–31° C./140 mm., 125 parts of an azeotrope of divinyloxyethane and β-hydroxyethyl vinyl ether comes over at 46°–48° C./30 mm. The azeotrope contains about 90% of the divinyl ether and 10% of monovinyl ether, which can be resolved by the usual methods. The distillation is discontinued at this point and to the bottoms is added 68 parts of ethylene glycol which is equivalent, on a molar basis, to the number of moles of the divinyloxyethane formed. This mixture is again passed through the reaction cycle and the various steps repeated. By a recycle process of this type ethylene glycol can be converted to β-hydroxyethyl vinyl ether and 1,2-divinyloxyethane in good conversion and yield. The ratio of the monovinyl to the divinyl ether can be raised from zero to greater than one by adjusting the product take-off.

EXAMPLE 9

There was dissolved under a nitrogen atmosphere 12.5 parts of sodium in 542 parts of benzyl alcohol. To this solution was added 172 parts of methylal. The resulting mixture was cooled to 4° C. and charged with acetylene up to a pressure of 240 p.s.i.g. until 78 parts of acetylene was absorbed. The mixture was pumped through a heated coil at 200°–205° C. with a residence time of about five minutes. The reaction mixture was distilled under reduced pressure and the distillate was fractionated. At 91°–100° C./25 mm. a fraction was obtained containing 95% of benzyl vinyl ether. This was purified by treatment with sodium followed by distillation. Pure benzyl vinyl ether was obtained, distilling at 103°–104° C./25 mm.

In place of the above aralkanol there may be used any alkylbenzyl alcohol, such as methylbenzyl, butylbenzyl, octylbenzyl, dimethylbenzyl, or butylmethylbenzyl alcohol, or other substituted benzyl alcohol, such as 4-chlorobenzyl, 2-aminobenzyl, or methylchlorobenzyl alcohol, or other phenylalkanol such as phenylethyl, phenylpropyl, and comparable ring substituted alcohols. In each case there is formed an aralkyl vinyl ether.

EXAMPLE 10

In the same way allyl alcohol (460 parts) was treated with 18 parts of sodium. This solution was diluted with 130 parts of methylal and charged with 105 parts of acetylene at 0° C. and 250 p.s.i.g. The mixture was heated under pressure (1500 p.s.i.g.) to maintain the liquid phase exclusively and a temperature of 180° C. was reached. A residence time of three minutes was employed. The reaction mixture was worked up in the usual way. An azeotrope was obtained at 66°–68° C., from which allyl vinyl ether was obtained, distilling at 67.5° C. and having a refractive index, $n_D^{20}$, of 1.4116.

When this procedure is applied to methallyl, crotyl, octenyl, or didecenyl alcohols there are obtained in favorable yield the corresponding alkenyl vinyl ethers.

EXAMPLE 11

To 370.6 parts of tert-butyl alcohol was added under a blanket of nitrogen 9.8 parts of potassium. After reaction of the potassium addition was made of 169 parts of methylal. This mixture was charged to the mix-bomb where acetylene was absorbed therein at 330 p.s.i.g. and 10° C. until about 65 parts had been taken up. The resulting mixture was passed under pressure sufficient to ensure entirely a liquid state through a heated reaction zone where a temperature of 192° C. was reached. Residence time was about seven minutes. The reaction mixture was resolved by flash-distilling followed by careful fractionation. At 72° C. an azeotrope was taken consisting of 68.4% of tert-butyl vinyl ether with the balance tert-butyl alcohol. The conversion to ether was 24% and the yield 60% based on the alcohol. The azeotrope was washed with water and the organic layer was dried over magnesium sulfate and distilled, the desired tert-butyl vinyl ether being obtained at 78°–79° C.

EXAMPLE 12

To 501 parts of cyclohexanol potassium (14.7 parts) was added. After solution was complete, 86.4 parts of dimethoxyethane was added. This mixture was charged with 74 parts of acetylene at about 0° C. and 360 p.s.i.g. The mixture was then pumped under pressure as a liquid through a heated reaction zone where a temperature of 190° C. was reached. The residence time was 3.5 minutes. By the usual distillation and fractionation an azeotrope consisting of 89.7% of cyclohexyl vinyl ether and cyclohexanol was taken at 77° C./73 mm., a total of 275 parts of this ether being obtained. This is a conversion of about 50% and a yield of about 70% based on the cyclohexanol. Treatment of the azeotrope with potassium followed by distillation gave pure ether distilling at 82°–83° C./80 mm.

In place of the above cyclohexanol there can be used other cycloaliphatic alcohols, including methylcyclohexanol, dimethylcyclohexanol, trimethylcyclohexanol, butylcyclohexanol, chlorocyclohexanol, cyclopentanol, dicyclopentenyl alcohol, dicyclopentanyl alcohol and chlorinated analogues thereof, etc.

EXAMPLE 13

To 362.4 parts of β-(p-tert-octylphenoxy)ethanol there was added under a nitrogen blanket 5.7 parts of potassium. After solution was accomplished, 66.4 parts of dimethoxyethane was added. The resulting mixture was cooled to about 10° C. and charged with about 14 parts of acetylene, the pressure being carried to about 300 p.s.i.g. This liquid mixture was forced through a heated reactor where a temperature of 192° C. was reached. Residence time was 5.3 minutes. The reaction mixture was distilled. At 133–137° C./1 mm. an azeotrope consisting of 56% of octylphenoxyethyl vinyl ether and octylphenoxyethanol was taken off. The yield this ether was 32%.

Other ether alcohols can be used in the same way as the alkylphenoxyethanol just above. For example, there may be reacted by the method of this invention such ether alcohols as phenoxyethanol, phenoxypropanol, phenoxybutanol, and their various analogues having one or more alkyl substituents in the ring. There are quite as readily reacted the alkoxyalkanols, cycloalkoxyalkanols, alkenoxyalkanols, and benzoxyalkanols. The wide variety of these and other alcohols which are readily reacted to give vinyl ethers by the method of this invention demonstrates the utility and effectiveness of this method.

EXAMPLE 14

To 470 parts of aminoethylethanolamine ($NH_2CH_2CH_2NHCH_2CH_2OH$)

was added 9.2 parts of sodium hydroxide, the mixture being heated to about 90° C. to complete solution of the catalyst. The resulting solution was cooled and treated with 120 parts of dimethoxyethane. This composition was chilled to 0°–5° C. and charged with acetylene up to 250 p.s.i.g., about 58 parts of aceytlene being absorbed.

The resulting mixture was passed entirely as a liquid under pressure sufficient to prevent any desorption of acetylene into a heated reactor where the residence time was 3–4 minutes. A temperature of 180° C. was reached. The reaction mixture was worked up as in previous examples. Dimethoxyethane was distilled at 36° C./130 mm.; a forerun was taken at 60°–84° C./9 mm.; and at 84°–86° C./9 mm. a fraction of 231 parts of aminoethylaminoethyl vinyl ether,

was obtained, a yield of 95% based on alcohol consumed and a similar percentage based on acetylene consumed.

Repetition of the above procedure with substitution of 15 parts of potassium hydroxide for the above sodium hydroxide leads to the identical product in at least as good a yield.

EXAMPLE 15

To 376 parts of 3-amino-1-propanol was added under a nitrogen blanket 5.8 parts of sodium. After reaction of the sodium was complete, dimethoxyethane in an amount of 95 parts was added. This mixture was charged to the mix-bomb, where acetylene was pressed in at 0°–5° C. up to 300 p.s.i.g., 64 parts being then absorbed. The resulting mixture was pumped under pressure sufficient to prevent desorption of acetylene or any appearance of a gaseous phase through a heated tube where a temperature of 180° C. was reached. The residence time was about 3.5 minutes. The reaction mixture was worked up in the usual way with distillation and fractionation. At 83° C./123 mm. there was obtained 197 parts of 3-aminopropyl vinyl ether.

As is known, vinyl ethers are highly useful as monomers which provide both homopolymers and copolymers which find use in diverse fields, including coating, casting, molding, textile finishing, etc. Vinyl ethers are also useful as chemical intermediates, reacting at the double bond by addition with many kinds of compounds which supply a reactive hydrogen.

The process of this invention provides advantages in that acetylene is not handled and is not present as a gas at high temperatures under pressure. It is applicable to the greatest variety of alcohols and produces the corresponding range of vinyl ethers, many of which are either not readily available or not known heretofore. The process proceeds at a favorable rate with high conversions and good yields. The process lends itself to continuous and efficient operation with a minimum of byproducts and production of pure ethers.

In the above examples it has been shown that the reaction mixture containing a vinyl ether is resolved with the aid of flash-distillation or a first distillation step, the purpose of which is merely to separate volatile materials from nonvolatile or difficultly volatile materials. These separations are accomplished without particular attention to temperatures or pressures, except that temperatures which would cause thermal decomposition are naturally avoided. The regular procedure then is to lower the pressure, for example, below one mm. if an oil pump is used, or below 30 mm. if a water pump is used, and heat the vessel containing the reaction mixture sufficiently to distill off the volatile materials. Pot temperatures may be noted and these are generally kept below 250° C. Temperatures are carried no higher than needed to take off volatile material at the pressure available. The overhead temperature is not of importance and is usually not determined. The temperature used will, of course, depend upon the particular volatile materials present and the reduced pressure available. As noted above, all that is desired here is to separate the volatile materials so that they can be fractionated without interference from catalyst, or other non-volatile substances.

We claim:

1. In a process for preparing vinyl ethers by reacting acetylene and an alcohol in the presence of a soluble, strongly basic vinylation catalyst, the improvement which comprises the steps of : (a) introducing acetylene under a pressure of about 10 to 30 atmospheres in a liquid mixture comprising an alcohol free of groups supplying acidic hydrogen and an inert organic solvent having a solubility for at least about 18 volumes of acetylene measured at standard conditions per volume of solvent at 0° C. and at one atmosphere pressure, said liquid mixture being substantially free of water and maintained at a temperature below about 10° C.; (b) continuing absorption of acetylene until the liquid mixture contains a ratio of the solvent to alcohol of from about 1:10 to 1:1 by weight; and (c) subjecting the alcohol-containing, water-free mixture, in the presence of a strongly basic alkali metal catalyst, to a reacting temperature between 160° and 250° C. under a pressure sufficient to maintain it in liquid phase and prevent desorption of acetylene.

2. The process of claim 1 in which at least a portion of the alcohol is added to the liquid mixture after acetylene has been introduced into the inert organic solvent therefor.

3. The process of claim 1 in which the catalyst used is an alkali metal alcoholate.

4. The process of claim 1 in which the catalyst used is an alkali metal hydroxide.

5. In a process for preparing vinyl ethers by reacting acetylene and an alcohol in the presence of a soluble, strongly basic vinylation catalyst, the improvement which comprises the steps of: (a) introducing acetylene under a pressure of about 10 to 30 atmospheres in a liquid mixture comprising an amino-substituted alcohol and an inert organic solvent, the alcohol being free of groups supplying acidic hydrogen, and the solvent having a solubility for at least about 18 volumes of acetylene measured at standard conditions per volume of solvent at 0° C. and at one atmosphere pressure, said liquid mixture being substantially water-free and maintained at a temperature below about 10° C.; (b) continuing absorption of acetylene until the liquid mixture contains a ratio of the solvent to alcohol of from about 1:10 to 1:1 by weight; and (c) subjecting the water-free acetylene-containing mixture, in the presence of a strongly basic alkali metal catalyst, to a reacting temperature between 160° and 250° C. under a pressure sufficient to maintain it in liquid phase and prevent desorption of alcohol.

6. The process of claim 5 in which at least a portion of the alcohol is added to the liquid mixture after acetylene has been introduced into the inert organic solvent therefor.

7. In a process for preparing vinyl ethers by reacting acetylene and an alcohol in the presence of a soluble, strongly basic vinylation catalyst, the improvement which comprises the steps of: (a) introducing acetylene under a pressure of about 10 to 30 atmospheres in a liquid mixture comprising an amino-substituted alcohol and an inert organic polyether solvent, the alcohol being free of groups supplying acidic hydrogen, and the solvent having a solubility for at least about 18 volumes of acetylene measured at standard conditions per volume of solvent at 0° C. and at one atmosphere pressure, said liquid mixture being substantially water-free and maintained at a temperature below about 10° C., (b) continuing absorption of acetylene until the liquid mixture contains a ratio of the solvent to alcohol of from about 1:10 to 1:1 by weight; and (c) subjecting the acetylene-containing, water-free mixture, in the presence of a strongly basic alkali metal catalyst, to a reacting temperature between 160° and 250° C. under a pressure sufficient to maintain it in liquid phase and prevent desorption of acetylene.

References Cited in the file of this patent

UNITED STATES PATENTS

| | | |
|---|---|---|
| 1,959,927 | Reppe | May 22, 1934 |
| 2,546,431 | Collardeau et al. | Mar. 27, 1951 |
| 2,617,829 | Maragaliano | Nov. 11, 1952 |
| 2,712,560 | McKinley et al. | July 5, 1955 |